(12) United States Patent
Takeuchi et al.

(10) Patent No.: US 6,312,543 B1
(45) Date of Patent: *Nov. 6, 2001

(54) PROCESS FOR PRODUCING TUBULAR ARTICLE FOR A FIXATION DEVICE

(75) Inventors: Kazutaka Takeuchi, Yokohama; Yasuhiro Tanaka, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,294

(22) Filed: Feb. 5, 1998

(30) Foreign Application Priority Data

Feb. 6, 1997 (JP) .................................................. 9-023814

(51) Int. Cl.[7] ...................................................... B32B 31/00
(52) U.S. Cl. .................. 156/218; 156/272.4; 156/308.2; 156/309.6; 399/328
(58) Field of Search ............................ 399/328; 156/190, 156/218, 308.2, 309.6, 583.2, 272.4, 86; 219/633, 634, 659

(56) References Cited

U.S. PATENT DOCUMENTS

| | | | | |
|---|---|---|---|---|
| 4,029,837 | * | 6/1977 | Leatherman | 156/272.4 X |
| 5,201,873 | | 4/1993 | Kikuchi et al. . | |
| 5,500,511 | * | 3/1996 | Hansen et al. | 219/633 |
| 5,508,496 | * | 4/1996 | Hansen et al. | 219/633 |
| 5,765,086 | * | 6/1998 | Kishino et al. | 399/329 |
| 5,778,293 | * | 7/1998 | Ohtsuka | 399/329 |
| 5,862,445 | * | 1/1999 | Ogawa et al. | 399/329 |

FOREIGN PATENT DOCUMENTS

| | | |
|---|---|---|
| 5-9027 | 2/1993 | (JP) . |
| 8-129314-A | * 5/1996 | (JP) . |
| 8-187773 | 7/1996 | (JP) . |

* cited by examiner

Primary Examiner—Jeff H. Aftergut
(74) Attorney, Agent, or Firm—Fitzpatrick, Cella, Harper & Scinto

(57) ABSTRACT

A process for producing a tubular article is provided which, comprising winding a first thermoplastic sheet film on a cylindrical member with the wind-starting portion and the wind-ending portion thereof overlapped, placing a metal tube outside the above wound film either (a) by winding a metal sheet with both of the sheet ends thereof abutted or (b) by fitting a metal tube, winding a second thermoplastic sheet film on the metal tube with the wind-starting portion and the wind-ending portion thereof overlapped, fitting a tubular member outside the wound second thermoplastic sheet film, and heating at least the first and second thermoplastic films to bond the overlapped portions of the thermoplastic sheet films. The tubular article produced according to the present invention has significantly improved film properties such as heat resistance (thermal expansion, break strength at high temperatures, etc.), thermal conductivity, electrical conductivity, and so forth in comparison with simple resin tubular articles (or films).

10 Claims, 12 Drawing Sheets

TEMPERATURE: ORDINARY TEMPERATURE

THE SHEETS REMAINS OVERLAPPED

THE GAP BETWEEN THE TUBULAR MEMBER AND THE CORE BAR (CYLINDRICAL MEMBER) IS CONSIDERABLY LARGE

THE GAP BETWEEN THE TUBULAR MEMBER AND THE CORE BAR IS NARROWED BY THE TEMPERATURE RISE

THE END PORTIONS ARE FLATTENED

PROCESS FOR PRODUCING TUBULAR ARTICLE FOR A FIXATION DEVICE

BACKGROUND OF THE INVENTION

1. Field of the Invention

The present invention relates to a process for producing a delivery belt for delivering precision parts with high positional accuracy, a film in a shape of a circle, tube, sleeve, ring, or belt for tight packing of articles, or a tubular article. The present invention is applied mainly to functional parts of image-forming apparatus.

2. Related Background Art

Conventionally, tubular articles having a metal layer as a part are produced typically by the methods below:
(1) Extrusion of a plastic material in a tube form by hot melt extrusion such as inflation around a metallic tube, and succeeding solidification by cooling,
(2) Casting of a solution of a resin or a resin precursor onto an external or internal surface of a metallic tube in a prescribed amount, and succeeding removal of the solvent (heat treatment if necessary), and
(3) A method disclosed by the inventors of the present invention (Japanese Patent Application Laid-Open No. 8-187773) in which a thermoplastic sheet film is wound on a cylindrical member with the wind-ending portion of the film laid on the wind-starting portion of the same film, a tubular member is fitted outside the wound film, and the entire is heated to join the overlapped portion of the film to form the sheet film into a tube, at least one of the thermoplastic sheet film having a layer containing metal powder dispersed therein.

In the hot melt forming method of the above item (1), when the tubular article produced by inflation is used as a film 20 of a fixation device of an image-forming apparatus as shown in FIGS. 10A and 10B, the tubular article is deformed irreversibly during the a sheet-drawing operation disadvantageously. The deformed tubular article will not recover the original shape since the tubular article has a metal layer as a part.

The casting method of the above item (2) involves the problems of difficulty in controlling the solution concentration, and in adjusting the drying atmosphere; the cost in solvent treatment in the drying step; and so forth in order to obtain a uniform thickness of the film.

In the method of the above item (3), a sheet film is wound with the one winding end is laid on the other winding end, a tubular member is fitted outside it, the level difference at the overlapping portion is flattened by decease of the gap distance between the cylindrical member and the tubular member by heat expansion to obtain a tubular film. In this method, the characteristic metal properties (e.g., thermal conductivity, and electroconductivity) are partly lost because metals should be contained in a thermoplastic resin in a powdery form.

SUMMARY OF THE INVENTION

An object of the present invention is to provide a process for producing a tubular article (or a tubular film) having no or less disadvantages of the aforementioned conventional tubular article, and to provide a fixation device, and a delivery unit employing the tubular article.

Another object of the present invention is to provide a tubular article having highly uniform thickness of the film of the tubular article.

Still another object of the present invention is to provide a process of producing a tubular article of high precision at a low cost at high productivity.

A further object of the present invention is to provide a toner fixation device of an image-forming apparatus by use of the aforementioned tubular article (tubular film).

The process for producing a tubular article comprises winding a first thermoplastic sheet film on a cylindrical member with the wind-starting portion and the wind-ending portion thereof overlapped; placing a metal outside the above wound film either (a) by winding a metal sheet with both of the ends thereof abutted, or (b) by fitting a metal tube; winding a second thermoplastic sheet film on the metal tube with the wind-starting portion and the wind-ending portion overlapped; fitting a tubular member outside the wound second thermoplastic sheet film; and heating at least the first and second thermoplastic films to bond the overlapped portions of the thermoplastic sheet films to complete the three-layered tubular article.

The tubular article produced according to the present invention is improved significantly in physical performances of a film such as heat resistance (e.g., thermal expansion, and break strength at a high temperature), thermal conductivity, and electrical conductivity owing to the metal layer constituting a part of the tubular article in comparison with a simple resin tubular article (or a film).

By employing the film of a highly uniform thickness of the present invention as a fixation film of the image-forming apparatus is useful not only for conventional heat transfer type of image fixation device but also for the fixation device employing an induction heating for heat generation of the fixation film itself, whereby various fixation devices can be produced which exhibit various high fixation performances.

The tubular article produced according to the present invention is useful as a closed loop tubular article for a fixation device and a transfer device for conductive image transfer.

DESCRIPTION OF THE PREFERRED EMBODIMENT

Figure 1A:
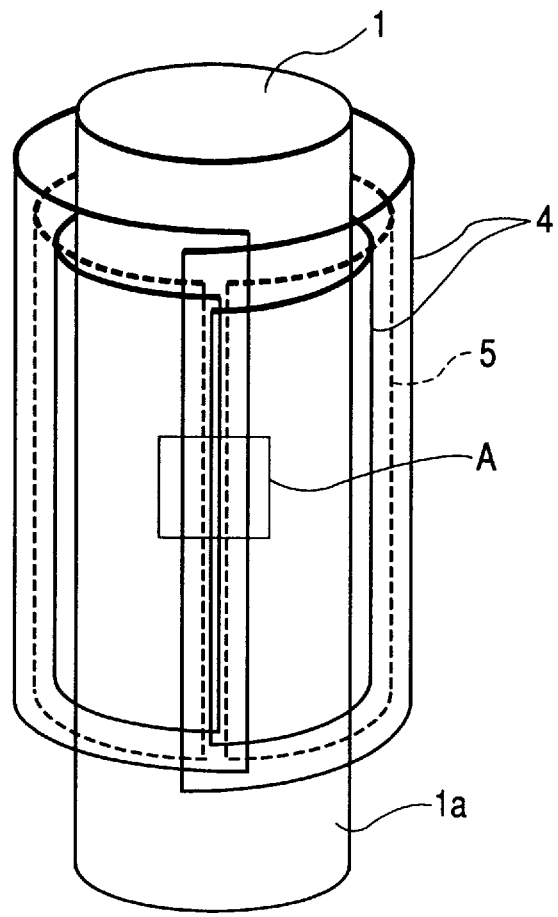
FIG. 1A is a perspective view for explaining a state of winding of three-layer sheets and a metal layer on a cylindrical member.

The tubular article in the present invention is in a shape of a loop, a ring, a cylinder, a hollow cylinder, or the like.

The present invention provides a tubular article constituted of multiple layers having at least one metal layer. The tubular article includes the ones having the innermost layer composed of a first thermoplastic resin and the outermost layer composed of a second thermoplastic resin, and the ones constituted of three layers.

The present invention provides a process for producing a tubular article which comprises winding a first thermoplastic sheet film on a cylindrical member with the wind-starting portion and the wind-ending portion thereof overlapped, placing a metal sheet outside the above wound film by winding a metal sheet with both of the sheet ends abutted, winding a second thermoplastic sheet film on the metal sheet with the wind-starting portion and the wind-ending portion thereof overlapped, fitting a tubular member outside the wound second thermoplastic sheet film, and heating at least the first and second thermoplastic films to bond the overlapped portions of the thermoplastic sheet films to complete the three-layered tubular article.

The present invention also provides another process for producing a tubular article which comprises winding a first thermoplastic sheet film on a cylindrical member with the wind-starting portion and the wind-ending portion thereof overlapped, placing a metal tube outside the above wound film by fitting a metal tube, winding a second thermoplastic sheet film on the metal tube with the wind-starting portion and the wind-ending portion thereof overlapped, fitting a tubular member outside the wound second thermoplastic sheet film, and heating at least the first and second thermoplastic films to bond the overlapped portions of the thermoplastic sheet films to complete the three-layered tubular article.

The thickness of the tubular article ranges preferably from 30 to 1000 $\mu$m. The cylindrical member has a thermal expansion coefficient preferably larger than that of the tubular member. The innermost layer (the first layer from the center axis of the tubular article) and the outermost layer (the third layer) are preferably constituted of the same thermoplastic film. The thickness of the employed thermoplastic film ranges preferably from 10 to 500 $\mu$m. The first layer and the second layer, and the second layer and the outermost layer (the third layer) are bonded preferably by a bonding agent. The metal layer (the second layer) is preferably a metal web or a punching-treated metal sheet. The opening size of the metal web ranges preferably from 50 to 600 meshes. The punched hole diameter of the punching-treated metal sheet ranges preferably from 0.2 to 20 mm. The metal web or the punching-treated metal sheet layer is preferably impregnated with the aforementioned adhesive, or impregnated with a thermoplastic resin. The thickness of the metal sheet is preferably not less than 5 $\mu$m. The outside of the tubular article is preferably provided with a resin layer having good releasability. The tubular article is useful as a fixation film of an image-forming apparatus.

The present invention is described below in more detail.

The tubular article of the present invention is constituted of multiple layers, at least one layer being composed of a metal layer, and the first layer from the center axis of the tubular article and the outermost layer are films composed of a thermoplastic resin.

The material for the film useful in the present invention may be any thermoplastic material, including typically polyethylenes, polypropylenes, methylpentene-1 polymers, polystyrene, polyamides, polycarbonates, polysulfones, polyarylates, polyethylene terephthalates, polybutylene terephthalates, polyphenylene sulfides, polyether sulfones, polyether nitrites, thermoplastic polyimide materials, polyether ether ketones, thermotropic liquid crystal polymers, and polyamides.

The film of the above resin material may contain a fine powdery organic or inorganic material for the purpose of imparting heat resistance, electroconductivity, thermal conductivity, and so forth. The film may be stretched in a desired stretching ratio for higher strength. The fine powdery organic material includes condensation type polyimide powder. The fine powdery inorganic material includes inorganic spherical fine particles such as carbon black powder, magnesium oxide powder, magnesium fluoride powder, silicon oxide powder, aluminum oxide powder, boron nitride powder, aluminum nitride powder, and titanium oxide powder; fiber particles such as carbon fiber particles, and glass fiber particles; whisker particles of potassium 6-titanate, potassium 8-titanate, silicon carbide, silicon nitride and the like; and other fine particles, in any shape and in any size. The total amount of the blended fine particulate matter is preferably in the range of from 5% to 50% by weight relative to the base resin.

The metal layer in the present invention is provided for imparting electroconductivity and thermal conductivity, and may be formed from any metal such as aluminum, stainless steel, copper, and nickel, or more preferably any alloy thereof.

The adhesive employed in the present invention includes adhesives in a broad sense used for assisting and strengthening the bonding of the metal layer to the resin layer, specifically not only general adhesives such as epoxy type or the like, but bonding assisting materials such as silane coupling agents and titanium coupling agents.

The present invention is described below more specifically by reference to examples.

EXAMPLE 1

FIGS. 1A and 1B and FIGS. 2 to 9 illustrate Example 1 of the present invention.

The numeral 1 indicates a cylindrical member as a mandrel for winding films 4 and a metal sheet 5: a solid bar in this Example. The numeral 2 indicates a tubular or hollow member having an inside diameter for inserting the above cylindrical member.

Stainless steel is used as the cylindrical member material, and invar is used as the tubular member material in this example.

Specific embodiment is described below.

The dimensions of the sheet films 4 and the metal foil (sheet) 5 are selected for the intended inside diameter of the tubular article (tubular film) to be produced.

Correspondingly, the sizes of the cylindrical member 1 and the tubular member 2 are selected.

The two sheet films 4 are respectively a sheet of thermoplastic material, polyetheretherketone (PEEK) cut in a size of 79.0 mm×300 mm, having a thickness of 20 μm.

The metal foil sheet 5 is a sheet of aluminum foil cut in a size of 75.4 mm×300 mm. On both of the faces of the aluminum foil, a polyamide type adhesive 5' is applied in a total thickness of 10 μm to facilitate the adhesion to the sheet films 4.

The cylindrical member is made of stainless steel having a thermal expansion coefficient of $1.5 \times 10^{-5}$ (/° C.). The tubular member is made of an invar material having a thermal expansion coefficient of $8.0 \times 10^{-6}$ (/° C).

The cylindrical member has a diameter of 24.00 mm, and a length of 330 mm. The tubular member has an inner diameter of 24.16 mm, an outside diameter of 30.0 mm, and a length of 330 mm. These dimensions are selected in design to obtain the difference of 100 μm between the outside diameter of the cylindrical member 1 and the inner diameter of the tubular member 2 at the heating temperature in the heating step mentioned later (370° C. in this example).

Figure 1B:
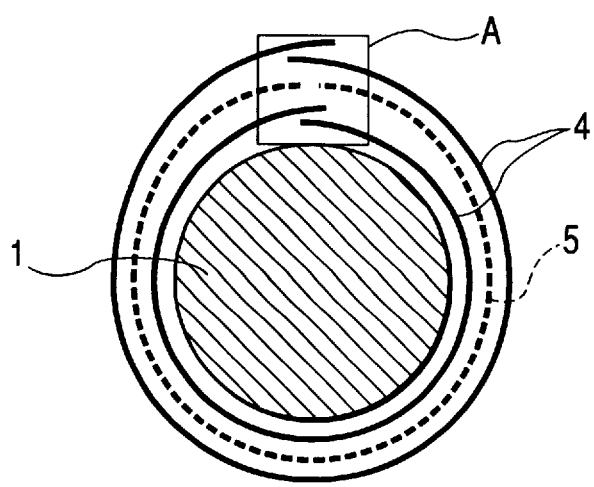
FIG. 1B is a plan view of the member shown in FIG. 1A.
Figure 2:
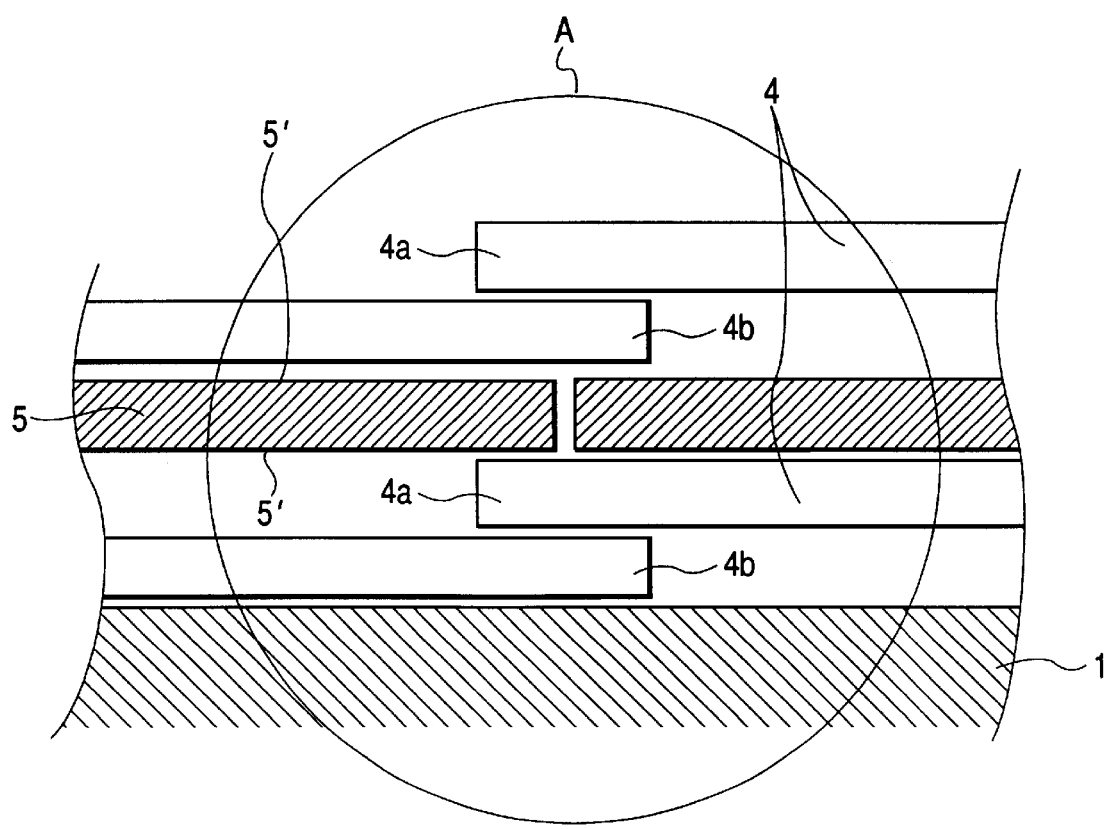
FIG. 2 shows the state of the end portions of the three layers wound on the peripheral face of the cylindrical member.
Figure 3:
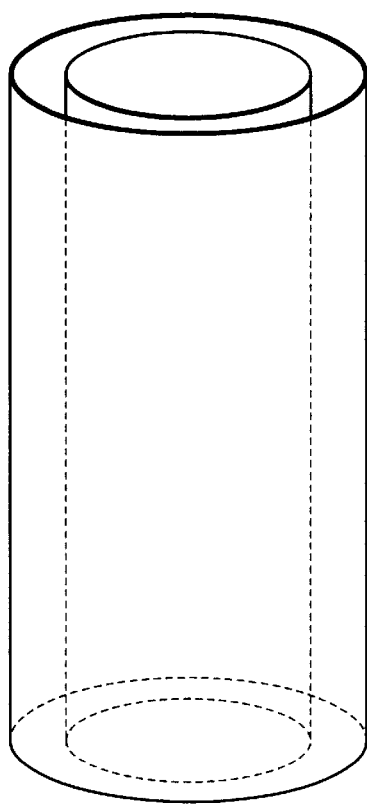
FIG. 3 shows a tubular member.
Figure 4:
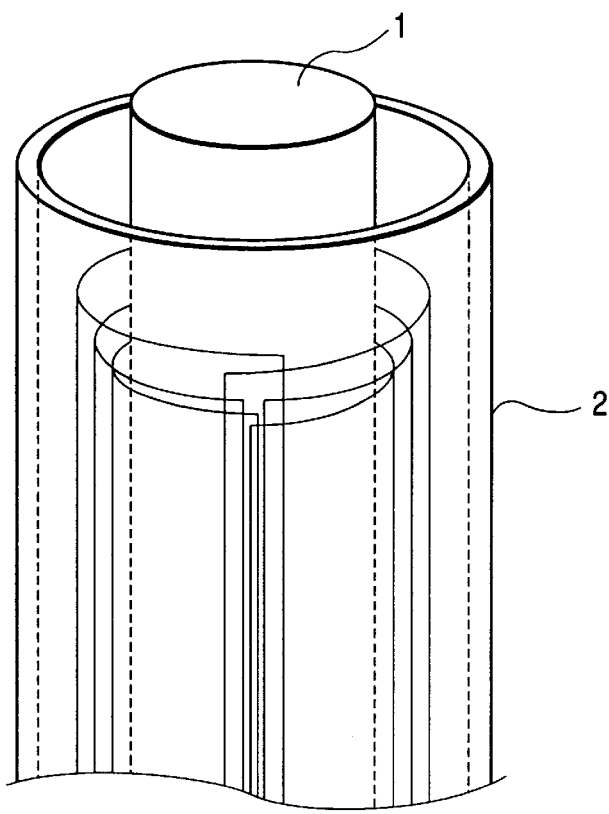
FIG. 4 shows a state of the three layers wound on a cylindrical member and tubular member covering the layers.

Firstly, the sheet film 4 prepared above is wound around the peripheral face 1a of the cylindrical member 1 as shown in FIGS. 1A and 1B such that both of the ends overlap with each other as shown in FIG. 2. Outside the sheet film 4, the aforementioned aluminum foil 5 is wound such that both of the ends come to be abutted with each other as shown in FIG. 2. Outside it, another sheet film 4 prepared as above is wound such that both of the ends overlap with each other as shown in FIG. 2. The position of the overlapping portion or the abutting portion of the layers is not limited. In this example, the overlapping and abutting portions are designed to come to the same position.

After the films and the metal of the respective layers are placed as above, the cylindrical member 1, the films 4, and the aluminum foil 5 are inserted into the hollow of the tubular member 2.

Figure 5:
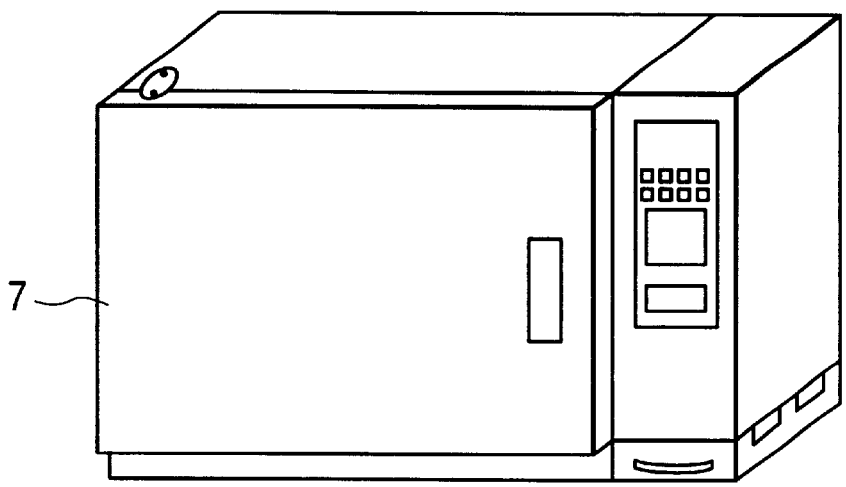
FIG. 5 shows a heating furnace for the heating step.
Figure 19:
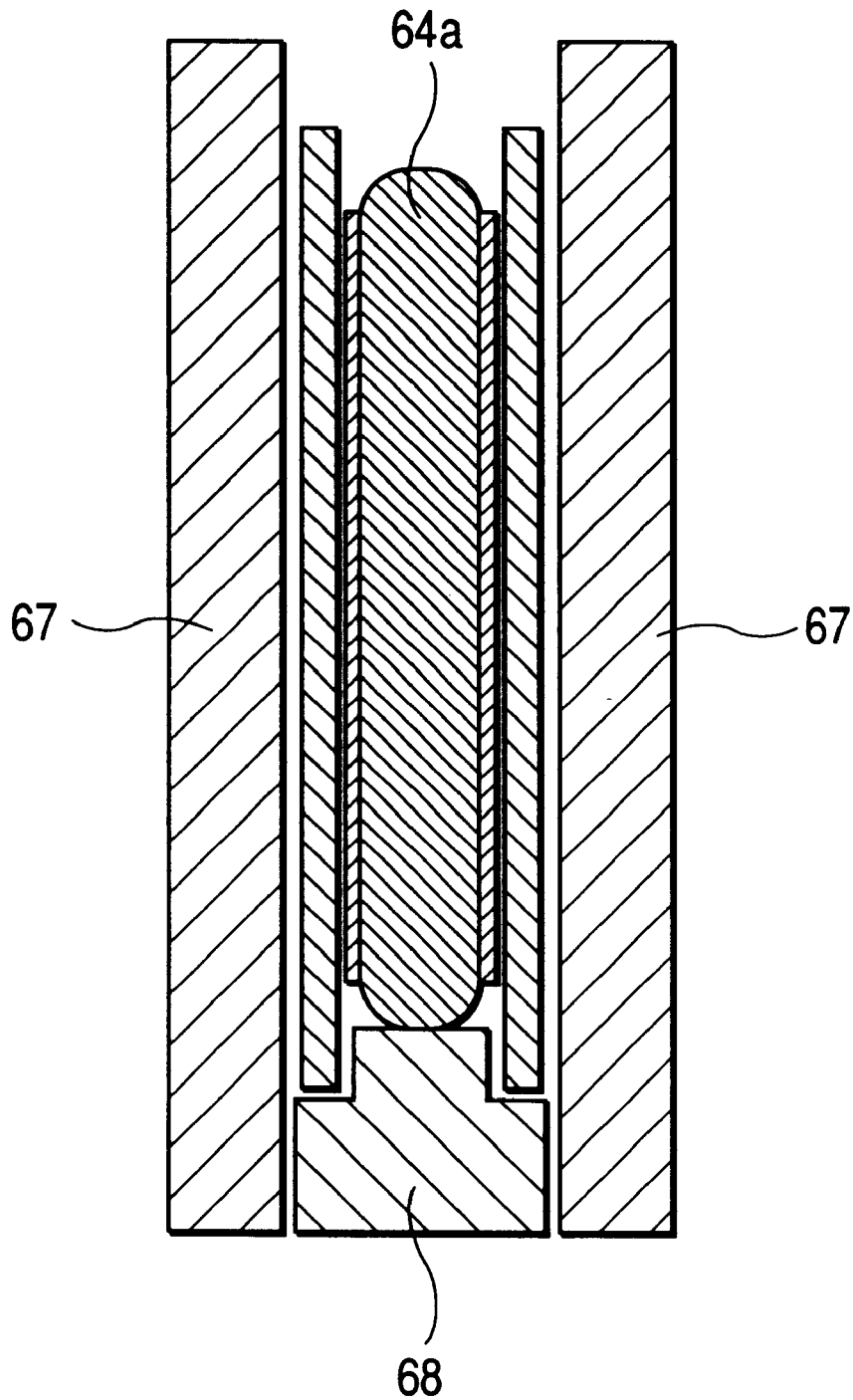
FIG. 19 is a sectional view of the heating apparatus.

The combination of the cylindrical member 1, the films 4, the aluminum foil 5 and the tubular member 2 are heated in a heating furnace 7 shown in FIG. 5. FIG. 19 shows the detailed structure of the heating furnace 7. In FIG. 19, a support 68 is fixed on a base not shown in the drawing, a heater 67 is placed on the support 68, and a space 64a is provided inside the heater 67 for placing the article (cylindrical member, films, and tubular member) to be heated. The temperature of the heater 67 is controlled by a temperature controller not shown in the drawing.

In this example, a heating furnace is used for the heating. However, another heating method such as induction heating may be employed since the heated article comprises metal members including the cylindrical member 1, the tubular member 2, and metal foil 5.

The heating in the heating furnace 7 is conducted at a temperature of 370±5° C. for a time of 30±1 minutes. The heating conditions are selected in consideration of the melting temperature of the film material and the heat deterioration of the film.

Figure 6:
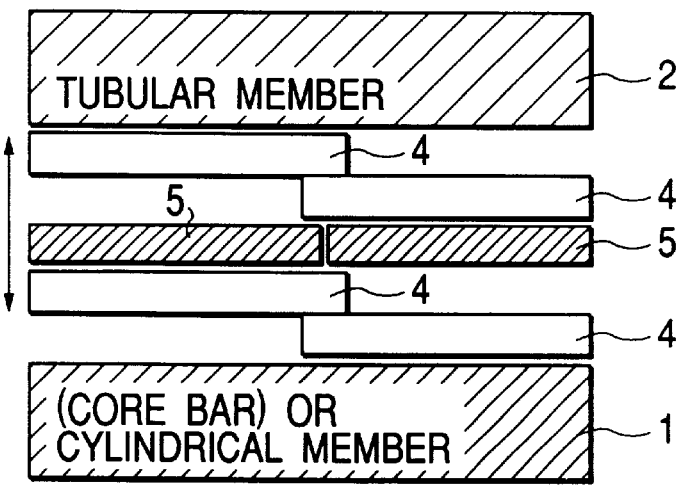
FIG. 6 shows a wound state of three layers constituted of sheet film layers and a metal layer.
Figure 7:
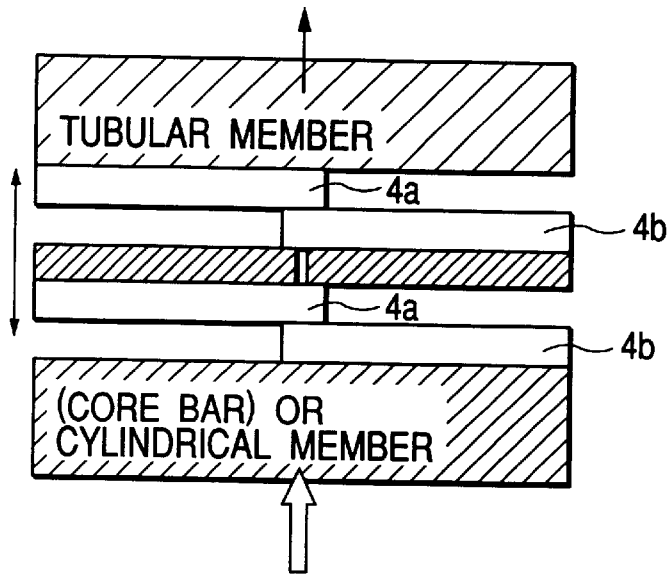
FIG. 7 shows a state of three layers between the cylindrical member and the tubular member.
Figure 8:
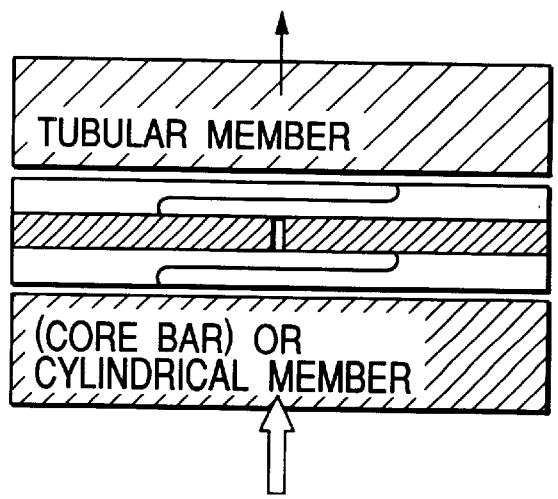
FIG. 8 shows a state of the heating.

During the heating in the heating furnace, the state of the combination of the cylindrical member 1, the tubular member 2, the films 4, and the aluminum foil 5 undergoes changes as shown in FIGS. 6 to 8. Initially, the two films 4 placed in the heating furnace 7 are respectively in a wound state in the gap between the cylindrical member 1 as the mandrel and the tubular member 2 to have the end portions 4a and 4b overlapped. From this state, the respective members are heated by the heating furnace 7. The cylindrical member 1 and the tubular member 2 begin to expand corresponding to the respective thermal expansion coefficients (FIG. 6). The thermoplastic films 4 begin to soften with the temperature rise. The cylindrical member 1 and the tubular member 2 expand with the temperature rise to decrease the difference between the outside diameter of the cylindrical member 1 and the inside diameter of the tubular member 2 in comparison with that at the initial low temperature since the thermal expansion coefficient of the stainless steel of the cylindrical member 1 is larger than that of the invar material of the tubular member 2 (FIG. 7). With the decrease of the gap width between the cylindrical member 1 and the tubular member 2, the films 4 held therebetween are softened further to come to be fusion-bonded at the overlapped portions of both of the ends 4a, 4b of the films. The films 4 and the aluminum foil 5 are bonded (fusion-bonded) uniformly by the applied heat and stress and by adhesion action of the adhesive 5'. The gap between the cylindrical member and the tubular member finally becomes equal to the intended thickness of the films to uniformize the film thickness over the entire circumference.

Figure 9:
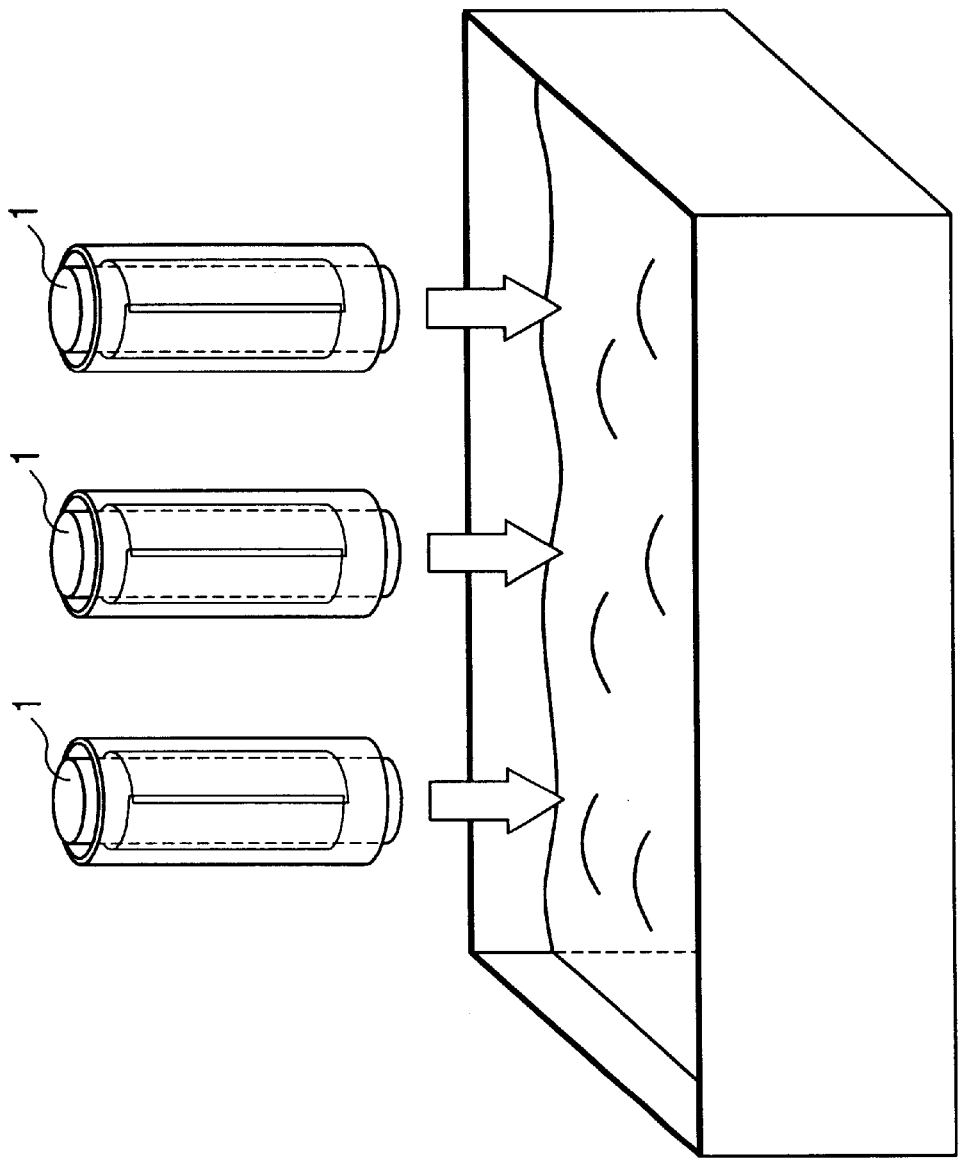
FIG. 9 shows a state of cooling.

The heating is continued for 30 minutes, and then heating is stopped and the article is cooled (FIG. 9). In the cooling step, the cooling may be conducted by still standing after the stop of the heating to cool the cylindrical member 1, the films 4, the aluminum foil 5, and the tubular member 2, or they may be cooled rapidly for shortening the cooling time. In this example, the heated article is put into cooling water in a water vessel to cool it at a cooling rate of 350° C./min to room temperature approximately. Then the films held between the cylindrical member and the tubular member are taken out.

The films taken out are formed into a tube (cylinder shape) with the overlapped portions 4a, 4b bonded smoothly.

An example of use of the tubular article (tubular film) prepared as above is described below.

Figure 10A:
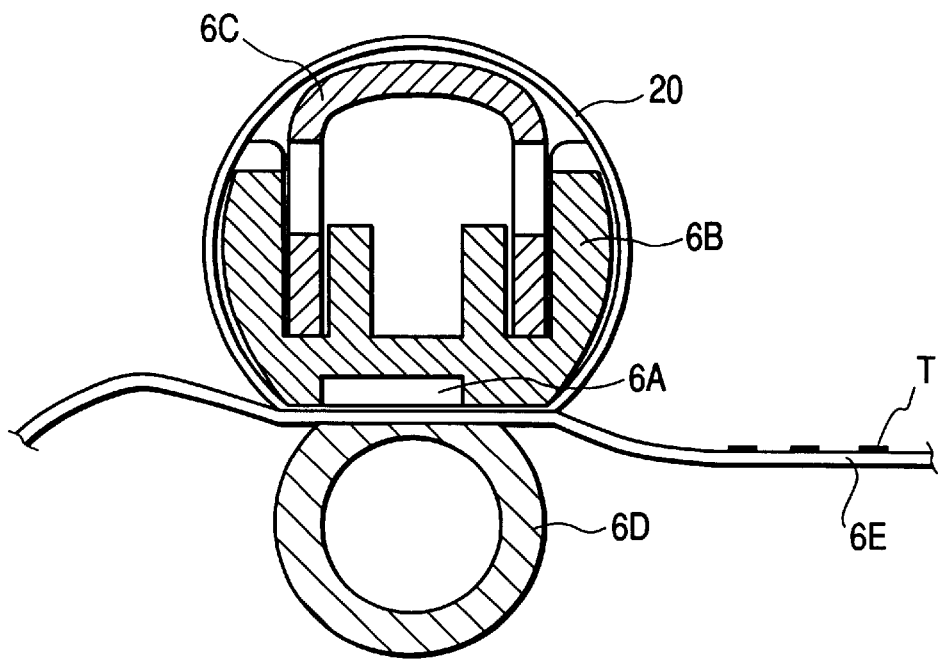
FIGS. 10A and 10B explain a fixation device of an image-forming apparatus employing the film of the present invention.

The tubular film obtained in this Example, after its outermost layer is coated with a fluororesin, is used as a fixation film 20 of a fixation device of an image-forming apparatus (LBP, laser beam printer) shown in FIG. 10A.

In FIG. 10A, a heater 6A for the heating the tubular film (fixation film) 20 is held by a heater holder 6B. A stay member 6C is provided in a U-shape. The fixation film 20 is fit on the peripheral face of the stay member 6C and the heater holder 6B. A pressing roller 6D is driven by a driving means not shown in the drawing.

In the fixation device, a carrier sheet 6E such as a paper sheet for carrying a toner for image formation is delivered through the nip between the fixation film 20 as shown in the drawing, and the pressing roller 6D to transfer the heat from the heater through the fixation film to the toner and to fix the toner by pressure and heat onto the paper sheet. The fixation film of the present invention enables formation of high-quality image with uniform and rapid heat transfer from the film to the toner, since the film has a uniform and precise thickness even at the overlapped portions of the sheet films and the sheet comprises a metal layer.

EXAMPLE 2

Figure 11:
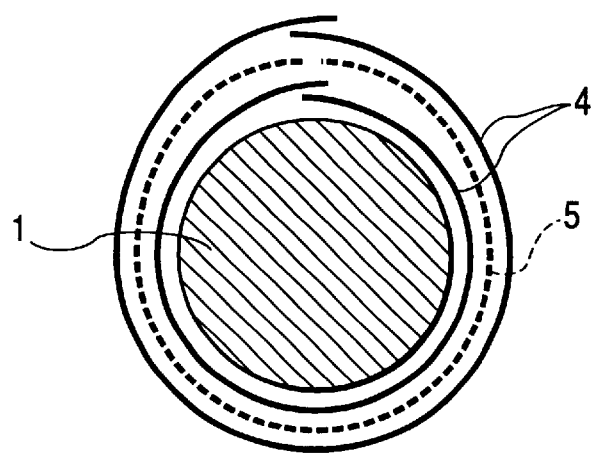
FIG. 11 is a drawing for explaining Example 2 of the present invention.
Figure 12:
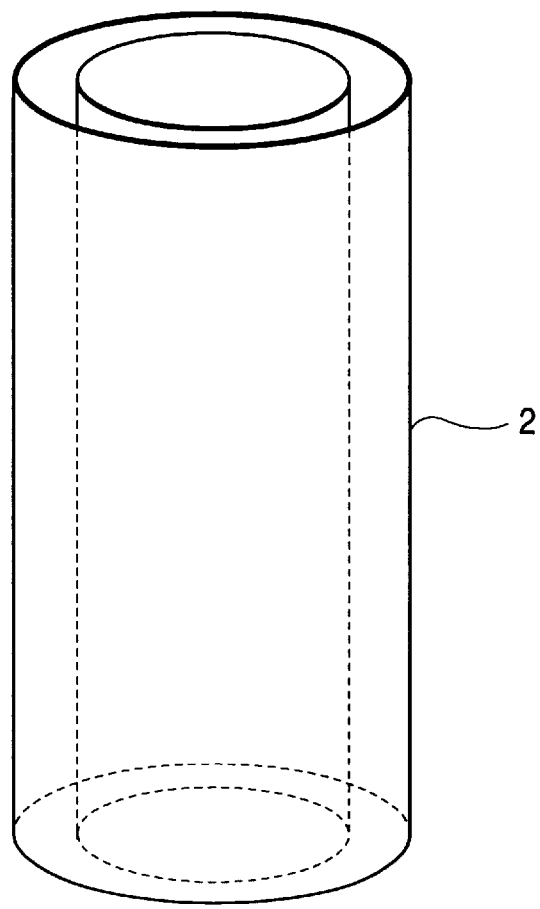
FIG. 12 is a drawing for explaining Example 2 of the present invention.

FIG. 11 and FIG. 12 illustrate a second example of the present invention. In this Example, a fluororesin sheet is employed as the thermoplastic sheet film for forming the outermost layer, which is more suitable for use as a fixation film of an image forming apparatus.

In FIG. 11, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member has a diameter of 24.00 mm, and a length of 330 mm. The tubular member has an inner diameter of 24.20 mm, an outside diameter of 30.0 mm, and a length of 330 mm. These dimensions are selected in design to obtain the difference of 100 μm between the outside diameter of the cylindrical member 1 and the inner diameter of the tubular member 2 on heating the members in the heating step to a temperature of 370° C.

On the peripheral face of the cylindrical member 1, a PEEK sheet film 4 of 20 μm thick having the same size as in Example 1 is wound with its both end portions overlapped. On the outer face of the PEEK film 4, a stainless steel sheet 5 of 10 μm thick is wound with both of the ends abutted. Further on the outside face, a sheet of fluororesin (PFA: tetrafluoroethylene-perfluoroalkyl vinyl ether copolymer) of 20 μm thick is wound with both of the end portions overlapped.

An adhesive 5' (not shown in the drawing) is applied on both of the faces of the stainless sheet 5 to assist its adhesion to the thermoplastic resin layers 4. In this Example, a polyamide type adhesive is applied on the PEEK film side, and fluororesin type adhesive (primer) is applied on the PFA film side.

The outside of the combination of the cylindrical member 1, the film 4, and the metal foil 5 is covered by the tubular member 2. The covered article is placed in a heating furnace shown in FIG. 19.

Heating is conducted at 370° C. for 30 minutes in the heating furnace. By the heating, the cylindrical member and the tubular member expand, the films are softened, and the space between the members decreases owing to the difference of the thermal expansion coefficients. As the results of softening of the films and compression of the films by the space decrease between the cylindrical member and the tubular member, the film end portions are bonded, and the layers are bonded together integrally by the adhesive 5' (not shown in the drawing) applied on both of the faces of the stainless steel sheet 5 with uniformity of the film thickness.

After the lapse of the above prescribed heating time, the heated article is taken out, and is cooled at a rate of 340° C./min. After one minute of cooling, the tubular article can be separated smoothly from the cylindrical member and the tubular member.

The separated tubular article is in a finished tube state (cylindrical shape), and the overlapped portions of the sheet films are bonded with smooth surfaces. The prepared tubular article can be used as the fixation film 20 of the image-forming apparatus shown in FIGS. 10A and 10B without coating of the outside face with a fluororesin, whereby the number of steps of the production is decreased to lower the production cost.

EXAMPLE 3

Figure 13:
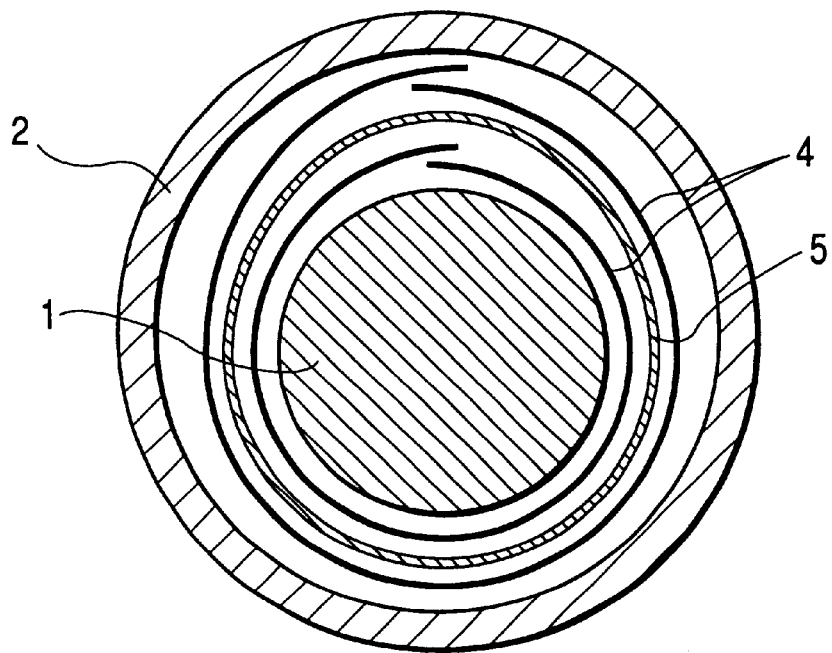
FIG. 13 is a drawing for explaining Example 3 of the present invention.

FIG. 13 shows a third example of the present invention.

In this Example, a metal foil tube is used as the metal foil to improve the strength of the produced tubular article for use as a member requiring a higher stiffness.

In FIG. 13, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member 1 has an outside diameter of 24.00 mm. The dimensions of the cylindrical member 1 and the tubular member 2 are designed so as to obtain the difference of 120 μm between the outside diameter of the cylindrical member 1 and the inside diameter of the tubular member 2 on heating the members in the heating step to a temperature of 300° C.

On the peripheral face of the cylindrical member 1, a sheet film 4 of PES (polyether sulfone) of 20 μm thick having the same size as in Example 1 is wound with its both end portions overlapped. On the outer face of the PES film, a nickel tube 5 of 20 μm thick is fitted, and further outside it, a tube of PFA of 20 μm thick is fitted. An adhesive 5' (not shown in the drawing) is applied on both of the faces of the nickel tube 5 for adhesion of the layers.

The outside of the combination of the cylindrical member 1, the thermoplastic films 4, and the nickel tube 5 is covered by the tubular member 2. The covered article is placed in a heating furnace shown in FIG. 19.

Heating is conducted at 300° C. for 30 minutes in the heating furnace. By the heating, the cylindrical member and the tubular member expand, the films are softened, and the space between the members decreases owing to the difference of the thermal expansion coefficients. As the results of softening of the films and compression of the films by the space decrease between the cylindrical member and the tubular member, the film end portions are bonded, and the layers are bonded together integrally by the adhesive (not shown in the drawing) applied on both of the faces of the nickel tube with a uniform film thickness.

After the lapse of the above prescribed heating time, the heated article is taken out, and is cooled at a rate of 270° C./min. After one minute of cooling, the tubular article can be separated smoothly from the cylindrical member and the tubular member.

The separated tubular article is in a finished tube state (cylindrical shape), and the overlapped portions of the sheet films are bonded with smooth surfaces.

The prepared tubular article has remarkably improved stiffness in the peripheral direction because the metal tube does not have a non-seamed portion of the metal layer as the second layer. Therefore, the prepared tubular article can be used as the fixation film 20 of the image-forming apparatus shown in FIG. 10 (higher class apparatus) for printing at a higher speed with a higher rotation rate.

EXAMPLE 4

Figure 14:
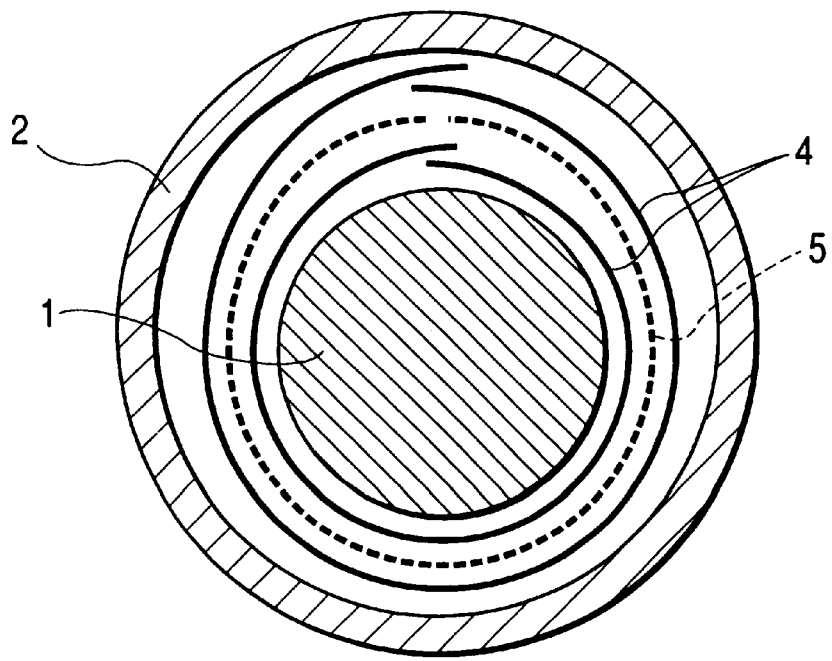
FIG. 14 is a drawing for explaining Example 4 of the present invention.

FIG. 14 shows a fourth example of the present invention.

In this Example, a metal foil web is used as the metal foil to obtain a tubular article having the layers in close contact without using an adhesive.

In FIG. 14, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member 1 has an outside diameter of 24.00 mm. The dimensions of the cylindrical member 1 and the tubular member 2 are designed so as to obtain the difference of 120 μm between the outside diameter of the cylindrical member 1 and the inner diameter of the tubular member 2 on heating the members in the heating step to a temperature of 300° C.

On the peripheral face of the cylindrical member 1, a sheet film 4 of PES (polyether sulfone) of 20 μm thick having the same size as in Example 1 is wound with its both end portions overlapped. On the outer face of the PES film, a nickel web 5 (opening size: 100 meshes) of 20 μm thick is wound with both of the ends abutted, and further outside it, a PES sheet 4 of 20 μm thick is wound with both of the end portions overlapped. No adhesive is applied on the faces of the nickel web 5, differently from Examples 1 to 3.

The outside of the combination of the cylindrical member 1, the thermoplastic films 4, and the nickel web 5 is covered by the tubular member 2. The covered article is placed in a heating furnace shown in FIG. 19.

Heating is conducted at 300° C. for 30 minutes in the heating furnace. By the heating, the cylindrical member and the tubular member expand, the films are softened, and the space between the members decreases owing to the difference of the thermal expansion coefficients. As the results of softening of the films and compression of the films by the space decrease between the cylindrical member and the tubular member, the film end portions are bonded, and the layers are united into one body with uniformity of the film thickness. Although no adhesive is applied between the films and the metal, a certain degree of bonding is caused by the anchor effect of the web (mesh), causing no problem practically.

After the lapse of the above prescribed heating time, the heated article is taken out, and is cooled at a rate of 270° C./min. After one minute of cooling, the tubular article can be separated smoothly from the cylindrical member and the tubular member.

The tubular article is separated in a finished tube state (cylindrical shape), and the overlapped layer portions of the sheet films come to be bonded with smooth surfaces.

The prepared tubular article is in a state of one body without an adhesive owing to the web form of the metal layer employed as the second layer, differently from Examples 1 to 3. Therefore, the tubular article can be produced at a lower cost by eliminating the adhesive material cost and the adhesion process cost.

Figure 10B:
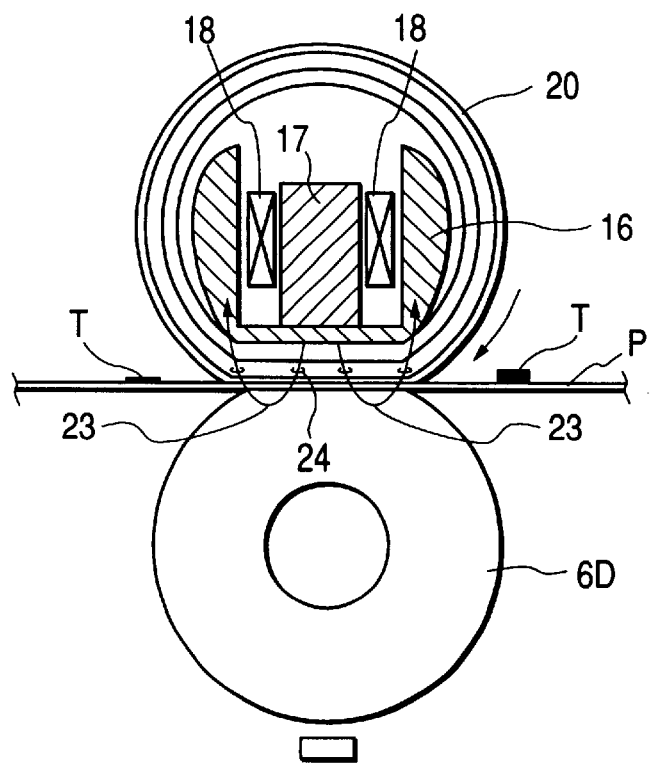

The tubular article produced in this Example is applied to an induction-heating type of image-forming apparatus as illustrated in FIG. 10B.

The fixation film 20 produced in this Example is rotated and pressed with control by a film guide 16. The film guide 16 serves also to support a high magnetic permeability core 17 and coils 18. The high permeability core 17 is constituted of a material such as ferrite and Permalloy conventionally used in transformers, preferably constituted of ferrite which causes less dielectric loss even at 100 kHz or a higher frequency.

The coils 18 are connected to an excitation circuit (not shown in the drawing) to generate high frequency wave of 20 to 50 kHz. The magnetic flux generated by the electric current applied to the coils from the excitation circuit is introduced to the high-permeability core 17, and generate magnetic fluxes 23 and eddy current 24 in the heat generation layer (metal layer) of the fixation film 20. Heat is generated by the eddy current 24 and the resistivity of the heat generation layer (metal layer).

The fixation device of the induction heating type of image forming apparatus generates heat by the above-described principle to melt, solidify, and fix the toner.

The induction heating type of fixation system can provide the heat generation position near to the toner in comparison with conventional contact heating systems, thereby improving the energy consumption efficiency. Incidentally, Japanese Patent Publication No. 5-9027 discloses a method of joule heat generation by eddy current generated by the magnetic flux in the fixation roller.

EXAMPLE 5

Figure 15:
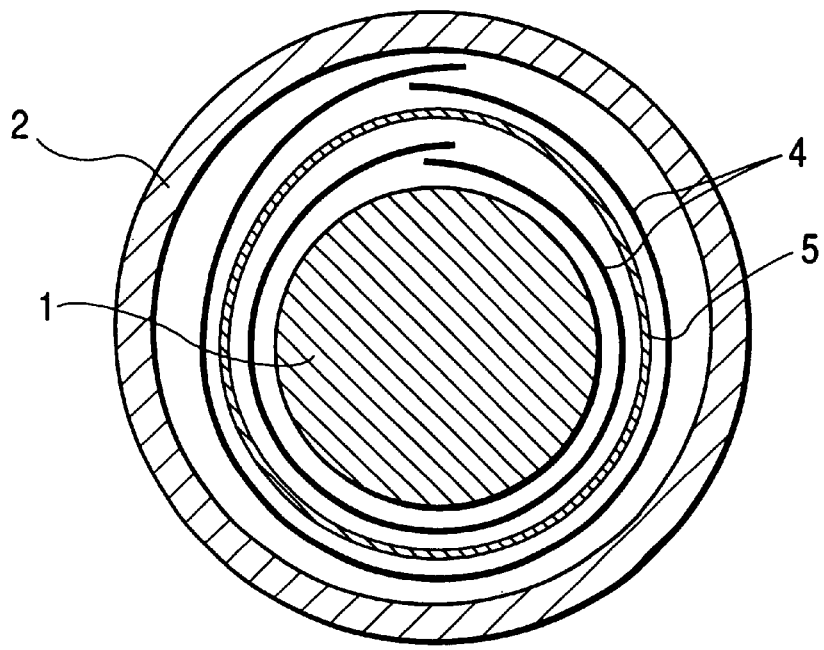
FIG. 15 is a drawing for explaining Example 5 of the present invention.

FIG. 15 shows a fifth example of the present invention.

In this Example, a metal foil web is used as the metal foil, and aforementioned adhesive is impregnated into the metal foil web to bond the layers strongly to obtain a tubular article having a higher stiffness.

In FIG. 15, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member 1 has an outside diameter of 24.00 mm. The dimensions of the cylindrical member 1 and the tubular member 2 are designed so as to obtain the difference of 120 μm between the outside diameter of the cylindrical member 1 and the inner diameter of the tubular member 2 on heating the members in the heating step to a temperature of 300° C.

On the peripheral face of the cylindrical member 1, a sheet film 4 of PES (polyether sulfone) of 20 μm thick having the same size as in Example 1 is wound with its both end portions overlapped. On the outer face of the PES film, a nickel web 5 (opening size: 100 mesh; tubular shape) of 20 μm thick is fitted, and further outside it, a PES sheet 4 of 20 μm thick is wound with both of the end portions overlapped. A polyamide type of heat-resistant adhesive is impregnated into the mesh of the nickel web 5.

The outside of the combination of the cylindrical member 1, the thermoplastic films 4, and the nickel web 5 is covered by the tubular member 2. The covered article is placed in a heating furnace shown in FIG. 19.

Heating is conducted at 300° C. for 30 minutes in the heating furnace. Then, the heated article is taken out, and is cooled at a rate of 270° C./min. After one minute of cooling, the tubular article can be separated smoothly from the cylindrical member and the tubular member.

The tubular article is separated in a finished tube state (cylindrical shape), and the overlapped layer portions of the sheet films come to be bonded with smooth surfaces.

The prepared tubular article has layers bonded more tightly owing to the anchor effect as in Example 4 as well as the bonding by the adhesive impregnated into the metal web.

EXAMPLE 6

Figure 16:
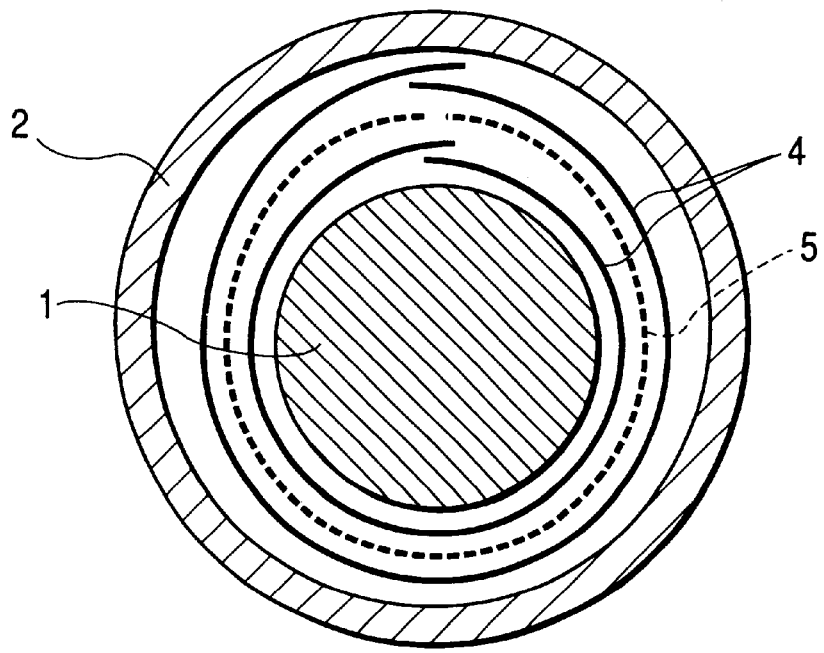
FIG. 16 is a drawing for explaining Example 6 of the present invention.
Figure 17:
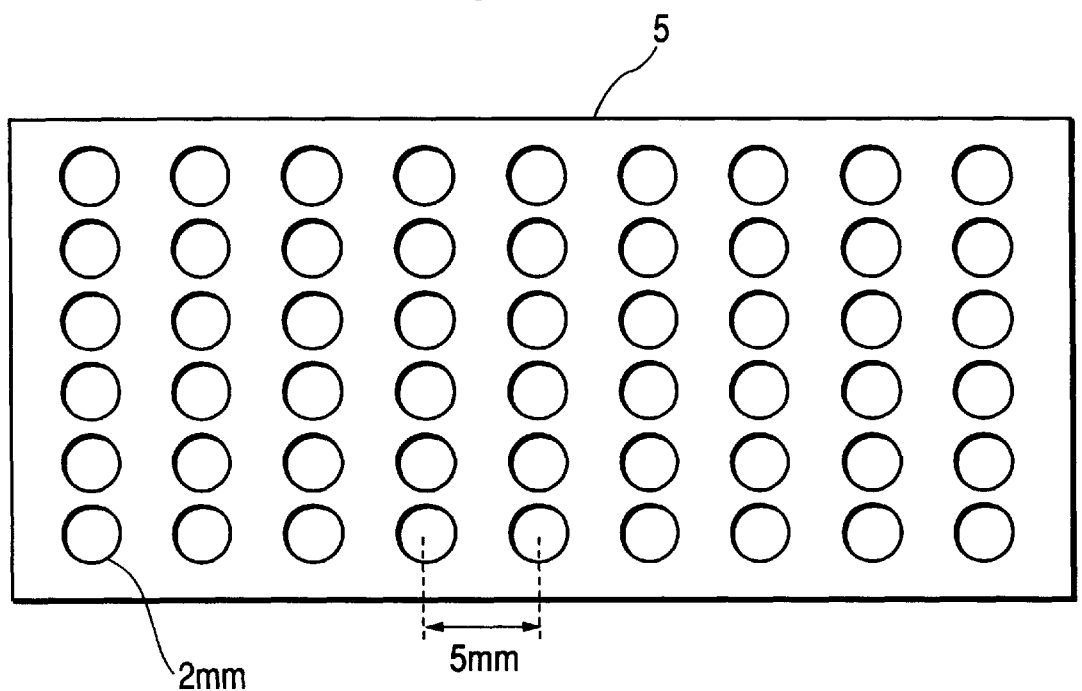
FIG. 17 is a drawing for explaining Example 6 of the present invention.

FIG. 16 and FIG. 17 show a sixth example of the present invention.

In this Example, a metal foil is subjected punching treatment, and the forming temperature is slightly higher to penetrate the thermoplastic resin into the punched holes from the front side and the back side (upper side and lower side) to obtain highly durable tubular article by utilizing the fusion-bonding of the resin itself at a low cost.

In FIG. 16, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member 1 has an outside diameter of 24.00 mm. The dimensions of the cylindrical member 1 and the tubular member 2 are designed so as to obtain the difference of 100 μm between the outside diameter of the cylindrical member 1 and the inner diameter of the tubular member 2 on heating the members in the heating step to a temperature of 320° C.

On the peripheral face of the cylindrical member 1, a sheet film 4 of PES (polyether sulfone) of 20 $\mu$m thick having the same size as in Example 1 is wound with its both end portions overlapped. On the outer face of the PES film, a punched aluminum foil 5 of 10 $\mu$m thick is wound with its both ends abutted. The employed aluminum foil 5 has been treated for punching, as shown in FIG. 17, to have circular punch holes of 2.0 mm diameter at constant center intervals of 5 mm. Further outside it, a PES sheet 4 of 20 $\mu$m thick is wound with both of the end portions overlapped.

The outside of the combination of the cylindrical member 1, the thermoplastic films 4, and the aluminum foil 5 is covered by the aforementioned tubular member 2. The covered article is placed in a heating furnace shown in FIG. 19.

Heating is conducted at 320° C. for 30 minutes in the heating furnace. Then, the heated article is taken out, and is cooled at a rate of 290° C./min. After one minute of cooling, the tubular article can be separated smoothly from the cylindrical member and the tubular member.

The tubular article is separated in a finished tube state (cylindrical shape), and the overlapped layer portions of the sheet films come to be bonded with smooth surfaces.

In production of the tubular article in this Example, the forming temperature is set slightly higher to lower the viscosity of the thermoplastic resin at the high temperature to promote the flow and penetration of the thermoplastic resin into the punched holes for fusion bonding of the thermoplastic resin of the first layer and the outermost layer. Thus, the desired tubular article can be produced at a low cost with a higher bonding strength between the layers than that achieved by the anchor effect in Example 4 without the penetration of the adhesive, differently from Example 5.

EXAMPLE 7

Figure 18:
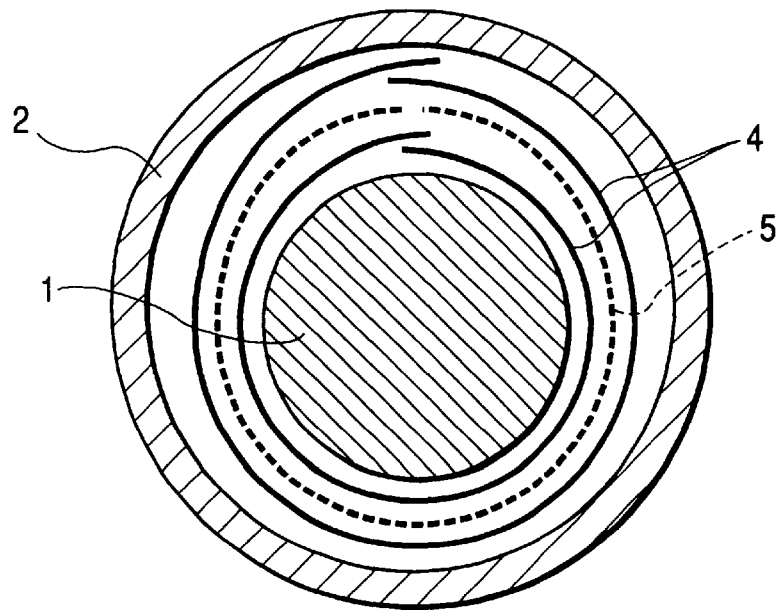
FIG. 18 is a drawing for explaining Example 7 of the present invention.

FIG. 18 shows a seventh example of the present invention.

In this Example, a metal foil is subjected to punching treatment, the forming temperature is raised slightly to penetrate the thermoplastic resin into the punched holes from the front side and the back side (upper side and lower side), and as a variation of the tubular article formation process of Example 6, the second thermoplastic sheet film is formed from a material different from that of the first thermoplastic sheet film.

In FIG. 18, the numeral 1 indicates an aluminum cylindrical member having a thermal expansion coefficient of $2.4 \times 10^{-5}$ (/° C.), and the numeral 2 indicates a tubular stainless steel member having a thermal expansion coefficient of $1.5 \times 10^{-5}$ (/° C.). The cylindrical member 1 has an outside diameter of 24.00 mm. The dimensions of the cylindrical member 1 and the tubular member 2 are designed so as to obtain the difference of 100 $\mu$m between the outside diameter of the cylindrical member 1 and the inner diameter of the tubular member 2 on heating the members in the heating step to a temperature of 320° C.

On the peripheral face of the cylindrical member 1, a sheet film 4 of PES (polyether sulfone) of 20 $\mu$m thick having the same size as in Example 1 is wound with its both end portions overlapped. The sheet film 4, prior to the winding, is coated at the outside face with an adhesive primer having sufficient adhesiveness to the fluororesin in a thickness of 5 $\mu$m.

Round the outer face of the PES film, a punched aluminum foil 5 of 10 $\mu$m thick is wound with its both ends abutted. The employed aluminum foil has been punched to have circular punch holes of 4.0 mm diameter at constant center intervals of 20 mm.

Further outside it, a sheet film 4 of the aforementioned fluororesin (PFA) of 20 $\mu$m thick is wound with both of the end portions overlapped.

The outside of the combination of the cylindrical member 1, the thermoplastic films 4, and the aluminum foil 5 is covered by the tubular member 2. The covered article is placed in a heating furnace shown in FIG. 19.

Heating is conducted at 320° C. for 30 minutes in the heating furnace. Then, the heated article is taken out, and is cooled at a rate of 290° C./min. After one minute of cooling, the tubular article can be separated smoothly from the cylindrical member and the tubular member.

The tubular article is separated in a finished tube state (cylindrical shape), and the overlapped layer portions of the sheet films and the layer interfaces come to be bonded with smooth surfaces.

In this Example, the tubular article having high durability can be produced at a low cost similarly as in Example 6. Further, when used as the fixation film 20 as shown in FIGS. 10A and 10B, the usually necessary fluororesin coating treatment can be omitted, thus resulting in further lower production cost.

The tubular articles produced in the above Examples according to the present invention have functions applicable to the delivery belt member.

What is claimed is:

1. A process for producing a tubular article, comprising:

winding a first thermoplastic sheet film on a cylindrical member with a wind-starting portion and a wind-ending portion thereof overlapped;

placing a metal outside the above wound film either (a) by winding a metal sheet having sheet ends with both of the sheet ends thereof abutted, or (b) by fitting a metal tube;

winding a second thermoplastic sheet film on the metal tube or the metal sheet with a wind-starting portion and a wind-ending portion thereof overlapped;

fitting a tubular member outside the above wound second thermoplastic sheet film; and heating at least the first and second thermoplastic films to bond the overlapped portions of the thermoplastic sheet films to complete a three-layered tubular article, wherein the cylindrical member has a thermal expansion coefficient larger than that of the tubular member, and wherein the metal comprises one of a metal mesh and a punched metal sheet.

2. The process for producing a tubular article according to claim 1, wherein the tubular article has a thickness ranging from 30 to 1000 $\mu$m.

3. The process for producing a tubular article according to claim 1, wherein the first and second thermoplastic films are made of the same material.

4. The process for producing a tubular article according to claim 1, wherein the first and second thermoplastic films.

5. The process for producing a tubular article according to claim 1, wherein the first thermoplastic film and the metal layer, and the metal layer and the second thermoplastic film are bonded with an adhesive.

6. The process for producing a tubular article according to claim 1, wherein the metal mesh or the punched metal sheet is impregnated with an adhesive.

7. The process for producing a tubular article according to claim 1, wherein the metal mesh or the punched metal sheet is impregnated with a thermoplastic resin.

8. The process for producing a tubular article according to claim 1, wherein the metal is a metal mesh and the metal mesh has openings with sizes ranging from 50 to 600 meshes.

9. The process for producing a tubular article according to claim 1, wherein the metal is a punched metal sheet which has punched holes of a diameter ranging from 0.2 to 20 mm.

10. The process for producing a tubular article according to claim 8 or 9, wherein the metal has a thickness of not less than 5 μm.

* * * * *

UNITED STATES PATENT AND TRADEMARK OFFICE
CERTIFICATE OF CORRECTION

PATENT NO.     : 6,312,543 B1
DATED          : November 6, 2001
INVENTOR(S)    : Kazutaka Takeuchi et al.

It is certified that error appears in the above-identified patent and that said Letters Patent is hereby corrected as shown below:

Column 1,
Line 46, "is" should read -- being --.
Line 48, "decease" should read -- decrease --.

Column 4,
Line 16, "nitrites," should read -- nitriles, --.

Column 10,
Line 50, "subjected" should read -- subjected to --.

Column 13,
Line 2, "films." should read -- films have a thickness ranging from 10 to 500 µm. --.

Signed and Sealed this

Seventh Day of May, 2002

Attest:

Attesting Officer

JAMES E. ROGAN
Director of the United States Patent and Trademark Office